United States Patent [19]

Sakai et al.

[11] Patent Number: 5,337,232

[45] Date of Patent: Aug. 9, 1994

[54] MORPHEME ANALYSIS DEVICE

[75] Inventors: Shinsuke Sakai; Takao Miyabe, both of Tokyo, Japan

[73] Assignee: NEC Corporation, Tokyo, Japan

[21] Appl. No.: 853,601

[22] Filed: Mar. 18, 1992

Related U.S. Application Data

[63] Continuation-in-part of Ser. No. 487,044, Mar. 2, 1990, abandoned.

[51] Int. Cl.⁵ .............................................. G06F 15/38
[52] U.S. Cl. ............................................. 364/419.08
[58] Field of Search .............. 364/419, 419.08, 419.01

[56] References Cited

U.S. PATENT DOCUMENTS

| | | | |
|---|---|---|---|
| 4,059,725 | 11/1977 | Sakoe | 179/1.5 |
| 4,771,385 | 9/1988 | Egami et al. | 364/419 |
| 4,931,936 | 6/1990 | Kugimiya et al. | 364/419 |

*Primary Examiner*—Roy N. Envall, Jr.
*Assistant Examiner*—Xuong Chung-Trans
*Attorney, Agent, or Firm*—Foley & Lardner

[57] ABSTRACT

In breaking a syntagm, such as a phrase, a clause, a sentence, or sentences, into a succession of analyzed morphemes, use is made of at least one group of morphemes included in the syntagm which includes two or more morphemes in a customary order. These two or more morphemes of each group are stored in a dictionary together with a descriptor, such as TIME or ANGLE, descriptive of the group, and an identifier or number indicative of the customary order. Selected by a separating unit, candidate morphemes for the analyzed morphemes are stored, together with, if any, the descriptor and at least one of the identifier or a mark, in a memory as memorized morphemes. An output unit selects those memorized morphemes which are accompanied by a common descriptor descriptive of a single group and either the identifier or the mark indicative of the customary order of morphemes in the group, and outputs these as the analyzed morphemes.

6 Claims, 8 Drawing Sheets

| | 31 | 32 | 33 | 34 | 35 |
|---|---|---|---|---|---|
| 36 SPELLING | A ME | GA | FU | RU | |
| 37 INTERVAL | 1 | 2 | 3 | 4 | 5 |
| 38 POSSIBLE PART OF SPEECH | NOUN | PARTICLE | VERB ROOT | INFLEC-TIONAL | PUNCTUATION |

FIG. 5

| SPELLING | EXPLANATION | AXIS FIELD VALUE |
|---|---|---|
| NEN | YEAR | AXIS (TIME, 60) |
| GATSU | MONTH | AXIS (TIME, 50) |
| NICHI | DATE | AXIS (TIME, 40) |
| JI | O'CLOCK | AXIS (TIME, 30) |
| FUN | MINUTE | AXIS (TIME, 20) |
| BYOU | SECOND | AXIS (TIME, 10) |

51 — SPELLING column
57 — EXPLANATION column
47, 49 — AXIS FIELD VALUE

FIG. 6

| 41 | 43 | 47 | 49 |
|---|---|---|---|
| NEN | TIME INSTANT | TIME | 60 |
| GATSU | TIME INSTANT | TIME | 50 |
| NICHI | TIME INSTANT | TIME | 40 |
| JI | TIME INSTANT | TIME | 30 |
| FUN | TIME INSTANT | TIME | 20 |
| BYOU | TIME INSTANT | TIME | 10 |

45 spans 47 and 49

61 — rows
63 — column indicator

MORPHEME ANALYSIS DEVICE

CROSS REFERENCE TO RELATED APPLICATION

This application is a continuation-in-part of application Ser. No. 07/487,044, filed Mar. 2, 1990, now abandoned.

BACKGROUND OF THE INVENTION

This invention relates to a device for breaking a Japanese sentence into a succession of morphemes. The device, previously called a "Device for Analyzing Japanese Sentences into Morphemes with Attention Directed to Morpheme Groups", is herein called by the short form name, "Morpheme Analysis Device."

A sentence consists of morphemes. Each morpheme may be either a dictionary word or an allomorph, depending on the circumstances. A sentence or portion of a sentence may properly be called a syntagm, since a syntagm is defined as a phrase, a clause, or a sentence.

The concept of morphemes is very useful for a language such as Japanese. In the English language, morphemes are easily detected since morphemes correspond to words, and spaces are placed around words. This is not true, in contrast, for a language such as Japanese, in which sentences are written without spacing, and thus, there is no pause between successive morphemes.

The morpheme analysis device is useful in a machine translation system which deals with the Japanese language as a source language. The morpheme analysis device is useful also in a speech sound synthesis system for producing speech sound in compliance with a text written in the Japanese language.

For the purposes of illustration, this specification will refer to Japanese syntagms written in an English equivalent as often as possible. Japanese use Chinese characters and phonetic characters (called Kanji and Kana, respectively) for their writing system. Chinese characters will not be used herein. If, however, it becomes necessary to phonetically represent a Japanese syntagm, the Japanese syntagm will be written in accordance with International Standard ISO 3602.

One method of separating a morpheme in a syntagm from other morphemes is described in "Pocket Handbook of Colloquial Japanese" cited in U.S. Pat. No. 4,635,199, issued to Kazunori Muraki and assigned to the present assignee and incorporated herein by reference. This method provides that the syntagm is first separated into morphemes with reference to a dictionary and by using a known algorithm for breaking the syntagm into morphemes. Examples of known algorithms are used in U.S. Pat. No. 4,931,936, issued to Shuzo Kugimiya, et al., and U.S. Pat. No. 4,771,385, issued to Kazunari Egami, et al., both incorporated herein by reference. Nevertheless, certain morphemes are ambiguous and may have more than one meaning which cannot be resolved by simply separating the morphemes.

In the Japanese language, use is occasionally made of a group of at least two morphemes, in which the morphemes customarily appear in a specific order. Examples of such a morpheme group are a section, a department, and a division of a corporation. It is possible to use such morpheme groups in resolving ambiguities which would otherwise be inevitable when breaking a syntagm into morphemes.

The following are examples of morpheme groups in which the morphemes appear in a customary order. In describing the following examples, the symbol "PT" is used in lieu of one Chinese character. As these examples illustrate, in Japanese, the character PT means, a part or parts, and is used in expressing, inter alia, (1) a time instant, (2) a measure of an angle, and (3) a ratio.

One Japanese syntagm, containing the morpheme PT, is "Zyûzi nizippun," which means "twenty minutes past ten" in English. When translated morpheme by morpheme into English and arranged from beginning to end of the Japanese syntagm, the syntagm is composed of four morphemes: "ten", "o'clock", "twenty", and "minutes" in English. The syntagm is usually written in Japan by a set of two Arabic numerals (or, more correctly, Hindu numerals) 10, another Chinese character represented herein by O'C, another set of Arabic numerals 20, and the character PT. When used to express a time instant in this manner, the character PT customarily appears after the other character O'C in a morpheme group which consists of two morphemes written by the characters 0'C and PT. These characters may be called a time instant group.

A second Japanese syntagm also containing the morpheme PT is "zyûdo nizippun," which means "ten degrees [and] twenty minutes" in English. The syntagm is composed of four morphemes: "ten", "degrees", "twenty", and "minutes" in English. The syntagm is ordinarily written by a set of Arabic numerals 10, still another Chinese character represented herein by DG, a set of Arabic numerals 20, and the character PT. When used to express a measure of an angle, the character PT is found after the other character DG in a group which consists of two morphemes written by the characters DG and PT. These morphemes may be called an angle group.

A third example of a syntagmcontaining the morpheme PT is a ratio. A ratio may be expressed in the Japanese language either according to a traditional expression, or by using "percent" which is pronounced and written "pasento" in kana letters. In the traditional expression, the character PT means a hundredth or hundredths and is located after yet another Chinese character which means a tenth or tenths. The tenths character will herein be represented by TTH. When used to express a ratio according to the traditional expression, the character PT occurs after the other character, TTH, in a group which consists of two morphemes written by the characters TTH and PT. These morphemes may be called a ratio group.

Another example of morpheme groups with customary orders are post office addresses. It is possible to express any address in Japan by using some of about fifteen morphemes of a group, however, addresses within postal wards are simplified and thus shorter. For example, the full address of the NEC Corporation is "Tôkyô-to Minato-ku Siba Gotyôme Sitiban [or, Nanaban] Zyûgogô" in the Japanese language. Depending on localities in twenty-three wards in Tokyo, a proper noun is substituted together with a suffix "mati" or "tyô" for the word "Siba" used in the above address. As the above address illustrates, an address used within a Tokyo ward uses five or six morphemes out of a group of the seven morphemes "to", "ku", "mati", "tyô", "tyôme", "ban", and "gô" in that order. This morpheme group may be called a Japan address group or simply an address group.

Such a group of morphemes is useful, if applicable, in breaking a syntagm into analyzed morphemes and resolving ambiguities. As illustrated by these three examples, the character PT has several meanings, depending on its context as determined by other characters or morpheme group within which it appears. The morpheme PT expresses a time instant if found after the morpheme O'C in the time instant group, a measure of an angle if located after the morpheme DG in the angle group, or a ratio if it appears after the morpheme TTH in the ratio group. Furthermore, morphemes within a Japan address group can be resolved if it is noted that they occur within a Japan address group.

Heretofore, no device has been known which has a capability of both analyzing morphemes and resolving these ambiguities. When breaking a syntagm into morphemes, ambiguities have not been removed by taking advantage of the customary order of morphemes within a morpheme group.

SUMMARY OF THE INVENTION

It is therefore an object of the present invention to provide a morpheme analysis device which can remove ambiguities when breaking a syntagm into a plurality of analyzed morphemes.

It is another object of this invention to provide a morpheme analysis device which breaks the syntagm into the plurality of analyzed morphemes by recognizing a specific order, based on customary usage, in which morphemes appear in a morpheme group.

A device in accordance with the present invention for breaking a syntagm into analyzed morphemes, using morpheme groups, includes a dictionary for storing a plurality of dictionary morphemes. It also includes a separating unit, accessing the dictionary morphemes in the dictionary, and supplied with the syntagm, wherein said syntagm is separated into at least one morpheme, and at least one candidate morpheme is selected from the dictionary morphemes for the morpheme. It further includes a memory, accessed by the separating unit, the memory storing the candidate morphemes as memorized morphemes, wherein at least one of the memorized morphemes is stored for the morphemes. It also includes an output unit, accessing the memorized morphemes in the memory and connected to the separating unit, wherein the memorized morphemes are selected by determining a morpheme group to which the morpheme belongs, the analyzed morphemes being selected from the morpheme group and produced as the analyzed morphemes.

A method in accordance with the present invention for breaking a syntagm containing a plurality of morphemes belonging to a morpheme group into analyzed morphemes, includes the steps of inputting a syntagm. The syntagm is separated into a plurality of morphemes. For each of a first morpheme and a subsequent morpheme of the plurality of morphemes, at least one of a plurality of dictionary morphemes having first and second fields as a candidate morpheme are selected and stored. The method also includes checking whether the first morpheme has at least one candidate morpheme selected which has a first field identical to a first field of at least one candidate morpheme for the subsequent morpheme, and if so, marking the candidate morpheme as a marked morpheme. The checking step is repeated for the plurality of morphemes, using the subsequent morpheme as the first morpheme. The marked morpheme is selected as an analyzed morpheme. The analyzed morphemes are output.

Other objects and advantages of the invention will become more apparent hereinafter in reference to the detailed description of the preferred embodiments and drawings.

BRIEF DESCRIPTION OF THE DRAWINGS

FIG. 5 is a table showing correspondence between AXIS fields and Japanese words in a morpheme group;

FIG. 6 is an example of dictionary morphemes in a morpheme group;

DETAILED DESCRIPTION OF THE PREFERRED EMBODIMENTS

Figure 1:
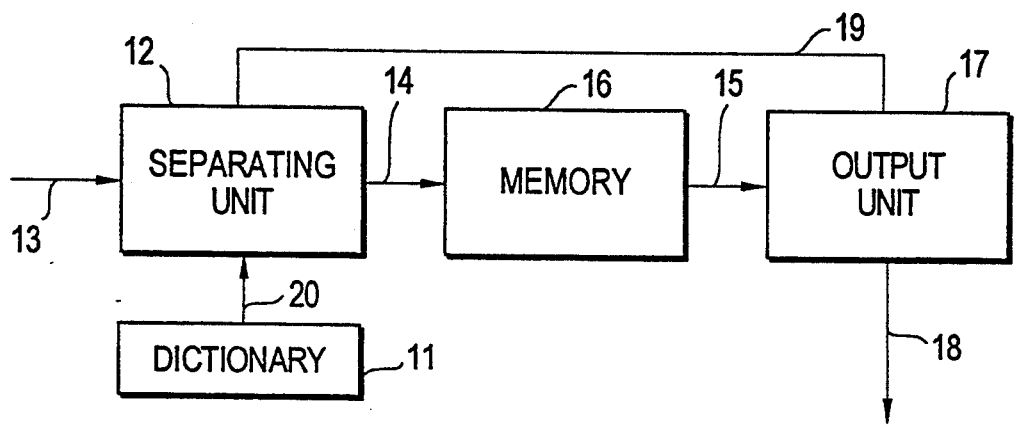
FIG. 1 is a block diagram of a morpheme analysis device according to one embodiment of the instant invention.

Referring to FIG. 1, a morpheme analysis device for breaking a Japanese syntagminto a succession of analyzed morphemes includes a dictionary 11, a separating unit 12, a memory 16, and an output unit 17.

An input connection 13 supplies the separating unit 12 with the syntagm in the form of a sequence of characters recognizable by an electronic digital computer. It will be presumed that the syntagm is given in a text written, together with punctuation marks, in Chinese characters and kana letters. Chinese characters and kana letters will herein be called characters, with no further distinction. However, the text could be written in other writing systems, such as Cyrillic or Roman letters. The input connection 13 includes an optical character recognition device (not shown) which supplies the syntagmto the separating unit 12, character by character, as signals which an electronic digital computer can recognize.

The separating unit 12 is connected to the dictionary 11 by a first connection 20. Prior to operation of the separating unit, the dictionary is loaded with dictionary morphemes. The separating unit 12 is also connected to the memory 16 by a second connection 14. The separating unit 12 supplies the memory 16 with potential dictionary morphemes, called candidate morphemes, along the second connection 14. The memory 16 then stores the candidate morphemes in connection with the morphemes. These stored candidate morphemes are called memorized morphemes.

The output unit 17 is connected to the memory 16 by a third connection 15. The separating unit 12 supplies an end signal along a fourth connection 19 to the output unit 17 when the separating unit 12 finishes selection of the candidate morphemes. The output unit 17 then resolves ambiguities and selects the appropriate memorized morphemes from the memory 16, which the output unit 17 outputs along an output connection 18.

Figure 2:
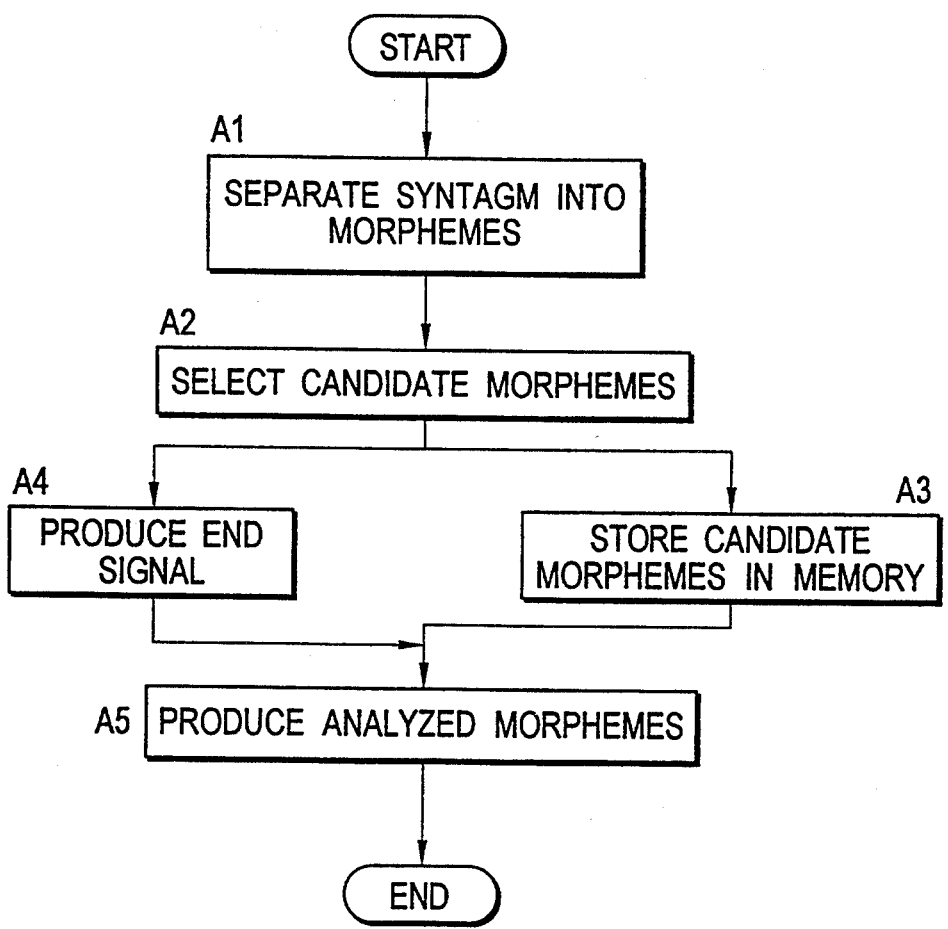
FIG. 2 is an overall flow chart for use in describing operation of the morpheme analysis device illustrated in FIG. 1.

Referring now to FIG. 2, the separating unit 12 is supplied with the syntagmby the input connection 13. In a first step A1, the separating unit 12 refers to the dictionary 11 and separates the syntagm into a plurality of morphemes by using a known algorithm such as discussed above. One example of such an algorithm is U.S. Pat. No. 4,931,936, issued to Kugimiya et al., and incorporated herein by reference. When a syntagm is in Roman letters, such as English, the algorithm is of course very simple, since morphemes are separated by spaces. A spoken syntagm may use as the algorithm a speech pattern recognition system. One speech pattern recognition system is disclosed in U.S. Pat. No. 4,059,725 issued to Sakoe (incorporated herein by reference), and is often implemented by a microprocessor.

Figures 3, 4:
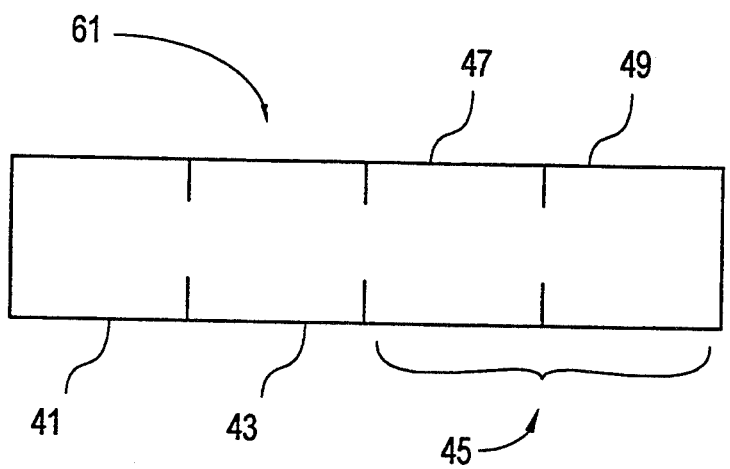
FIG. 3 is a chart of a Japanese sentence divided into morphemes.
FIG. 4 illustrates the fields in a dictionary morpheme.

FIG. 3 illustrates a Japanese sentence that has been divided into a plurality of morphemes by using the known algorithm. The sentence which has been divided is "AMEGAFURU." (punctuation included) which means "It rains." In this example, the sentence is divided into the five morphemes 31-35. As discussed above, in English, a morpheme can correspond to a word. However, this is not true in all languages, including Japanese. A spelling row 36 shows each morpheme. An interval row 37 shows the order in which each morpheme customarily occurs. A possible part of speech row 38 shows the possible part of speech for each of the morphemes. Note that the morphemes include the punctuation 35. There can be multiple dictionary definitions for any morpheme. For example, "AME" 31 can be defined as "candy" and "rain", and therefore would have two dictionary definitions. The dictionary 11 contains a dictionary morpheme for each definition of a morpheme, and thus would have two dictionary morphemes for "AME."

Referring back to FIG. 2, in a second step A2, the separating unit 12 selects candidate morphemes from the dictionary morphemes in dictionary 11. For each morpheme, one or more candidate morphemes may be selected.

At step A3, candidate morphemes are stored as memorized morphemes in the following way. When the separating unit 12 selects a plurality of candidate morphemes from dictionary 11, the separating unit 12 causes the memory 16 to store the plurality of candidate morphemes as a plurality of memorized morphemes.

At step A4, the output unit 17 is supplied with the end signal along the fourth connection 19 from the separating unit 12, when the separating unit 12 finishes selection of the candidate morphemes for the syntagm. At step A5, the output unit 17 resolves ambiguities among the memorized morphemes, and supplies the output connection 18 with the analyzed morphemes. Operation of the output unit 17 and separating unit 12 will be described later in detail.

The dictionary 11 has a plurality of fields for each of a plurality of dictionary morphemes, for example, three fields. Each field provides at least one signal representative of a field entry.

FIG. 4 illustrates the fields in a dictionary morpheme 61. One of the fields is called a morpheme field 41, which is for storing the morpheme.

Another of the fields, called an AKO field 43, is used to memorize an AKO field entry representative of "a kind of" semantic class into which the morpheme in question is classified in accordance with its meanings. Examples are AKO(time instant) and AKO(angle) for the morpheme, PT.

Still another field will be called an AXIS field 45, which further has first and second AXIS fields. The element in the first AXIS field, a descriptor 47, designates a semantic class, in which words occurring together in a morpheme group are used. The element in the second AXIS field, an identifier 49, defines the relative position in the morpheme group in which it may occur. Each first and second AXIS field 47, 49 corresponds to a morpheme field. The fields of the dictionary morpheme may be implemented as a record with four fields. For every definition of a morpheme, there is a dictionary morpheme. Thus, if a morpheme is ambiguous, because it occurs within a plurality of morpheme groups, the morpheme will have more than one first and second AXIS field in the dictionary 11. Other structures may advantageously be used in implementing dictionary morphemes for ambiguous morphemes, for example, pointers can be used.

FIG. 5 illustrates the AXIS field values 47, 49 of a morpheme group for the dictionary morphemes for the semantic class "time instant." This includes spellings 51 "NEN" (meaning year), "GATSU" (month), "NICHI" (date), "JI" (o'clock), "FUN" (minute), and "BYOU" (second) An explanation 57 of the spelling 51 is included in FIG. 5 for clarity. The element in the first AXIS field 47 is the descriptor TIME, which is the same for all entries for this semantic class. The element in the second AXIS field 49 shows the order that is customarily used in a time instant expression such as 12GATSU25-NICHI12JI15FUN (12:15, December 25).

Dictionary morphemes for a morpheme group are preferably contiguous. Thus, those words with the same element in the first AXIS field 47 appear together. They should be in the customary order, arranged in descending order according to the element in the second AXIS field 47. The AXIS field entry 45 is herein written as AXIS(t, n), where the variables t and n represent the first field, a descriptor, and the second field, an identifier which may be an integer. FIG. 6 is an illustration of the morpheme group 63 in FIG. 5, showing the morpheme field 41, the AKO field 43, the descriptor 47 and the identifier 49 of the AXIS field 45, for each dictionary morpheme 61 of the morpheme group 63.

There could be a number of semantic classes, for example, TIME, ANGLE, and ADDRESS. Each semantic class corresponds to a morpheme group. The number G will herein be used to represent the number of all semantic classes that appear as the first element of AXIS fields. Thus, G represents the number of all morpheme groups. The number g refers herein to an index to any morpheme group in the dictionary 11. The number $N(g)$ as used herein refers to the number of different identifiers of second AXIS fields 49 for the morpheme group indexed by g. Thus, in the example in FIG. 6, if g is TIME, $N(g)$ will be 6.

Figure 7:
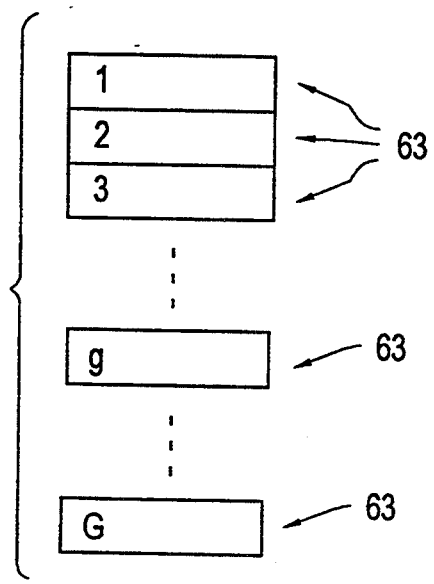
FIG. 7 illustrates morpheme groups in the dictionary.

Referring now to FIG. 7, in accordance with one aspect of the present invention, first through G-th groups 63 of dictionary morphemes are used when breaking a syntagm into the analyzed morphemes. Each morpheme group 63 will herein be called a g-th group, where g is a variable between one and G, inclusive.

Figure 8:
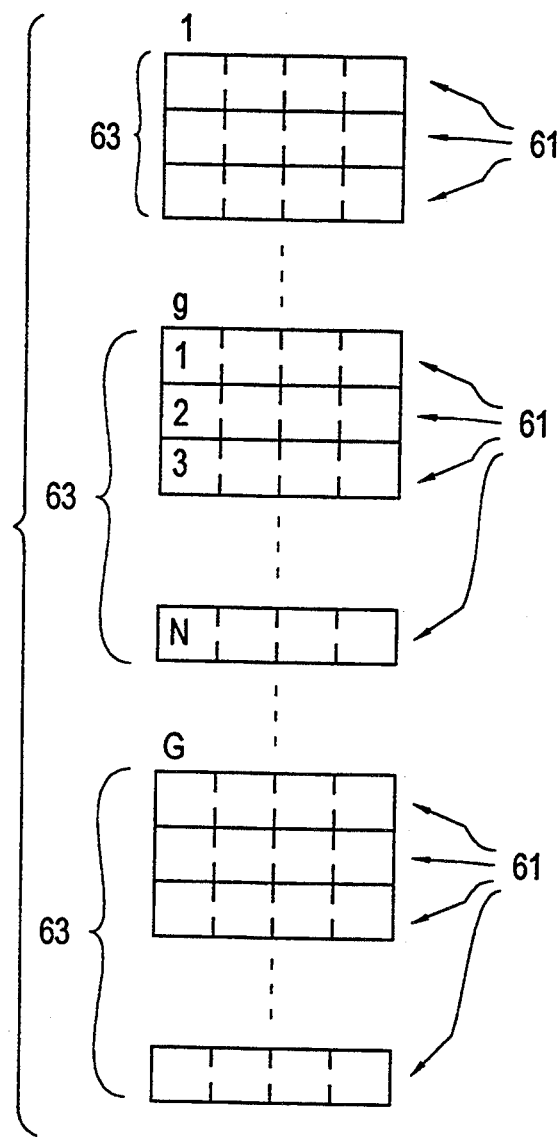
FIG. 8 is a version of FIG. 7, expanded to illustrate dictionary morphemes.

FIG. 8 is a version of FIG. 7, expanded to show dictionary morphemes 61 in morpheme groups 63. The g-th group comprises a plurality of first through N-th dictionary morphemes 61 in the customary order from the first morpheme to the N-th morpheme, where N represents a first integer which is not less than two. The first through the N-th morphcrees of the g-th group are herein referred to alternatively as first g-ary through N(g)-th g-ary morphemes, where N(g) represents a first g-ary integer which is not less than two. The customary order of the g-th group is called a g-th order.

In a syntagm, all or only a part of the morphemes of the g-th group may actually be used, as is the case with the address group. The morphemes which are used are thus subsets of the morpheme group, and are herein referred to as first g-ary through M(g)-th g-ary candidate morphemes of the first g-ary through the N(g)-th g-ary dictionary morphemes, where M(g) represents a second g-ary integer which is not greater than N(g).

Not all morphemes belong to a morpheme group. When that is the case, the AXIS field of the dictionary morpheme is empty. However, when the dictionary morpheme under consideration belongs to the g-th group of morphemes, the AXIS field stores the g-th descriptor and the g-th identifier.

In the dictionary 11, the first through the G-th groups are represented by first through G-th descriptors including a g-th descriptor. First through G-th customary orders are indicated by first through G-th identifiers including a g-th identifier.

A mark is used for indicating whether a morpheme belongs to a morpheme group. Preferably, a plurality of first g-ary through N(g)-th g-ary marks are contiguous to the g-th identifier of the first g-ary through the N(g)-th g-ary morphemes. More preferably, the marks can be the identifiers, and the identifiers are integers, either in an ascending or descending order. The integers may or may not be consecutive.

Prior to operation of the device, the dictionary 11 is loaded with the g-th descriptor, the g-th identifier, the AKO field, and the morpheme field, for each of the first g-ary through the N(g)-th g-ary morphemes of the dictionary morphemes.

Figure 9:
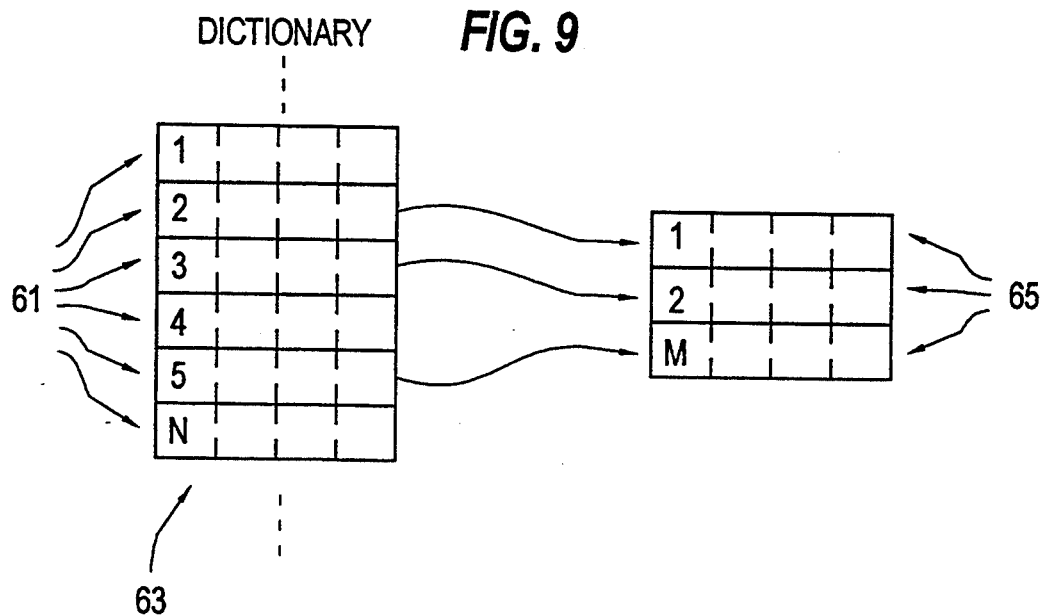
FIG. 9 illustrates M(g) candidate morphemes selected from the morpheme group having N(g) dictionary morphemes.

Referring now to FIG. 9, the separating unit 12 selects candidate morphemes 65 from dictionary morphemes 61. When the syntagm includes first g-ary through M(g)-th g-ary entries of the first g-ary through the N(g)-th g-ary morphemes of the g-th group 63, the separating unit 12 selects a g-ary morpheme as a first candidate morpheme 65 from one of the morpheme groups that may be called a first g-ary group. The first g-ary candidate morpheme comprises one of the first g-ary through the N(g)-th g-ary dictionary morphemes. In this manner, the separating unit 12 selects at least one M(g)-th g-ary candidate morpheme. The M(g)-th g-ary candidate morpheme 65 or morphemes are all or a subset of the first g-ary through the N(g)-th g-ary dictionary morphemes 61. The first g-ary through the M(g)-th g-ary candidate morphemes 65 are in the g-th customary order among the morpheme group.

Figure 10:
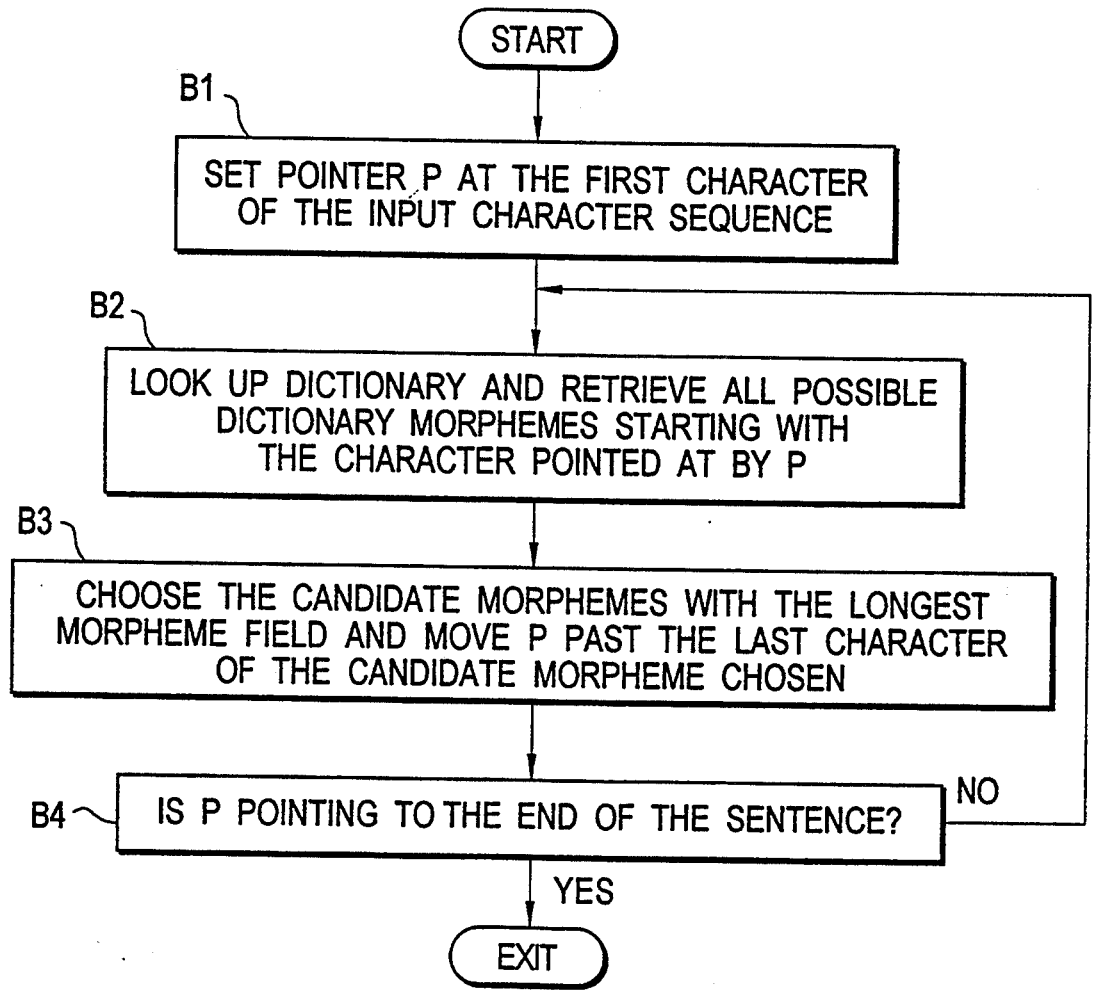
FIG. 10 is a flow chart of a separating unit illustrated in FIG. 1.

FIG. 10 illustrates the operation of the separating unit 12. As described above, the input connection supplied the characters in sequence. Assume that the characters have been supplied. The character sequence will be analyzed by the separating unit 12. One implementation of the separating unit 12 advantageously treats the character sequence as a string with a pointer. P is the pointer to a character in the input character sequence. At step B1, the pointer P is set to the first character of the input character sequence. At step B2, the separating unit 12 searches the dictionary 11 and retrieves all possible dictionary morphemes starting with the character pointed to by P as candidate morphemes. These candidate morphemes are supplied to the memory 16 and stored as memorized morphemes in the memory 16. At step B3, the separating unit 12 finds the candidate morphemes with the longest morpheme field and increments P by the length of the longest morpheme field such that P points one character beyond the last character of the character sequence corresponding to the dictionary morpheme just chosen. At step B4, the separating unit 12 ascertains whether the input syntagm is completely analyzed. If P is pointing to the end of a sentence, the separating unit terminates. Otherwise, it repeats beginning with step B2, with P now pointing to the next character in the input character sequence.

The memory 16 then has stored the first g-ary through the M(g)-th g-ary memorized morphemes in connection with the first g-ary through the N(g)-th g-ary dictionary morphemes. In the memory 16, the first g-ary through the M(g)-th g-ary memorized morphemes include the fields of the first g-ary through the M(g)-th g-ary dictionary morphemes of the first g-ary through the N(g)-th g-ary dictionary morphemes. When only one group of morphemes is sufficient to break a syntagm into the analyzed morphemes, the memory 16 need only store a descriptor and an identifier accompanying each of the first through the M-th morphemes of the dictionary morphemes. Frequently, only one group of morphemes is sufficient.

Thus, when the first g-ary through the N(g)-th g-ary marks are used by the separating unit 12, the dictionary 11 has the first g-ary through the N(g)-th g-ary dictionary morphemes. In contrast, the memory 16 has the first g-ary through M(g)-th g-ary memorized morphemes. The memorized morpheme which was in a morpheme group has the mark. As described above, the mark can be the identifier. A memorized morpheme with a mark is a marked morpheme. Inasmuch as the first g-ary through the N(g)-th g-ary morphemes are accompanied by the g-th descriptor and the g-th identifier, the g-ary marked morphemes are accompanied by the g-th descriptor and the g-th identifier. As described above, not all morphemes belong to morpheme groups, and therefore not all memorized morphemes have marks.

The output unit 17 selects memorized morphemes from the memory 16, removes any ambiguities and outputs analyzed morphemes. To select the analyzed morphemes from the memorized morphemes, the output unit 17 checks whether or not each of the memorized morphemes is marked, i.e., accompanied by the g-th descriptor and the g-th identifier. Beginning with a first memorized morpheme, if the memorized morpheme is found to be accompanied by the g-th descriptor and the g-th identifier, that first one would very likely be a first analyzed morpheme. It should be noted that the expression "a first analyzed morpheme" does not necessarily mean that this one stands first in the analyzed morphemes. A next memorized morpheme would be a second analyzed morpheme. In this manner, the g-ary marked morphemes are selected from the memorized morphemes in memory 16 and are used as the analyzed morphemes when the g-th identifier indicates that the g-ary marked morphemes are in the g-th customary order. Inasmuch as the morpheme analysis device is implemented by an electronic digital computer which may be a microprocessor, it is readily possible to carry out such check and selection by the output unit 17.

When the first g-ary through the M(g)-th g-ary memorized morphemes of the first g-ary through the N(g)-th g-ary dictionary morphemes have marks which indicate that the g-ary memorized morphemes are in the g-th customary order, the output unit 17 selects the g-ary marked morphemes for use as the analyzed morphemes.

Figure 11:
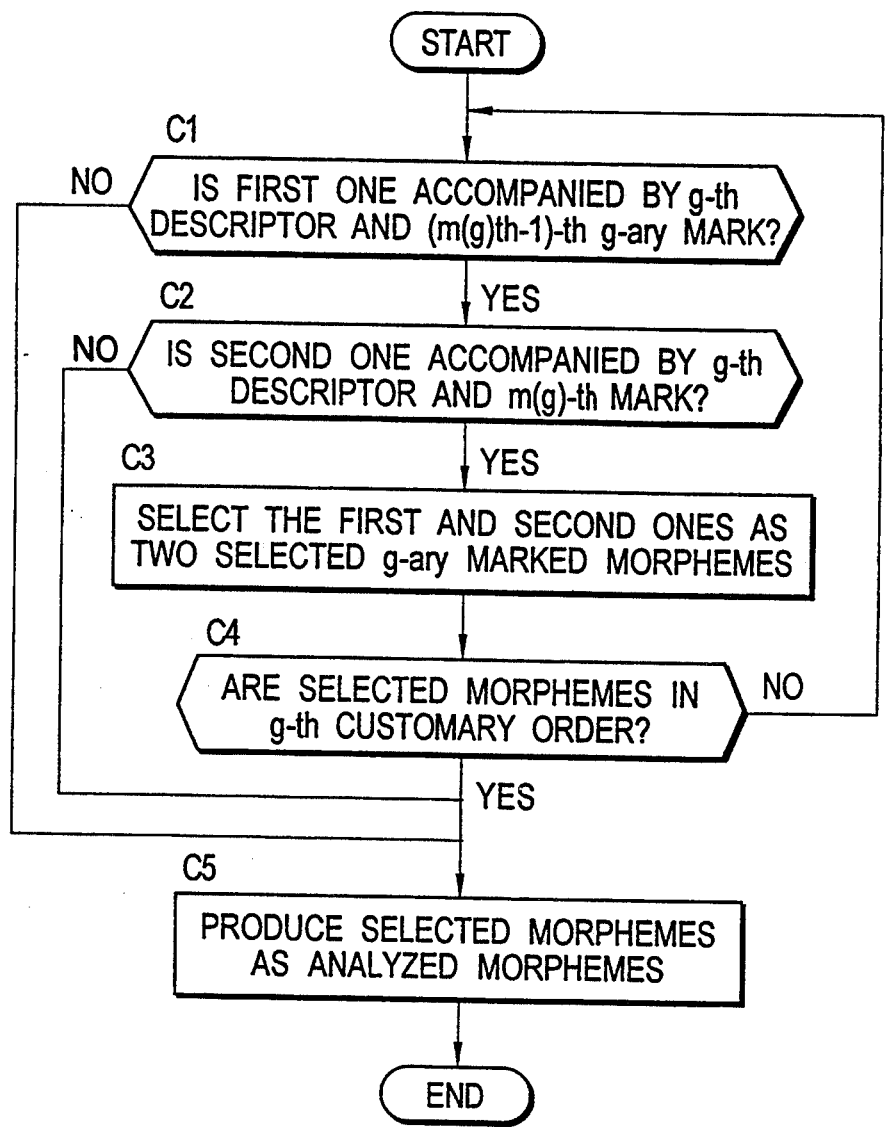
FIG. 11 is a partial flow chart of an output unit illustrated in FIG. 1.

Referring to FIG. 11, operation of the output unit 17 will be described in more detail. The output unit 17 can be implemented as a part of the microprocessor, and carries out first g-ary through M(g)-th g-ary steps including an m(g)-th g-ary step, where m(g) is variable between two and M(g), both inclusive.

At an (m(g)-l)-th g-ary step, illustrated as a first step C1, the output unit 17 checks whether or not the first memorized morpheme is accompanied by the g-th descriptor and an (m(g)-l)-th g-ary identifier of the first g-ary through the N(g)-th g-ary marks. Like the above-mentioned first analyzed morphemes, the first memorized morphemes need not necessarily be first among the memorized morphemes in the memory 16.

If it is determined that the first memorized morpheme is accompanied by the g-th descriptor and the (m(g)-l)-th g-ary identifier of the first g-ary through the N(g)-th g-ary marks, at a second step C2 the output unit 17 checks at the m(g)-th g-ary step whether or not a second memorized morpheme is accompanied by the g-th descriptor and an m(g)-th g-ary identifier of the first g-ary through the N(g)-th g-ary marks.

In the affirmative case, at a third step C3 the output unit 17 uses the first and the second memorized morphemes as two of the g-ary selected morphemes. Steps C1 and C2 are readily carried out by the electronic digital computer in parallel rather than in series.

At a fourth step C4, the output unit 17 checks whether or not the two selected morphemes are in the g-th customary order. If they are in the g-th customary order or if the proper descriptor has not been found in steps C1 or C2, at step C5 the output unit 17 produces the memorized morphemes of the two selected morphemes as two analyzed morphemes. If they are not, in the g-th customary order at step C5 the output unit uses the first memorized morpheme as one of the analyzed morphemes and repeats the first step C1 until one of the memorized morphemes having a g-th descriptor is found, and the (m(g)-l)-th g-ary memorized morpheme of the first g-ary through N(g)-th g-ary is used recursively as the first memorized morpheme. The second step C2 is likewise carried out. If the result is negative at the fourth step C4, the output unit 17 repeats the first step C1 until all memorized morphemes are checked.

Figure 12:
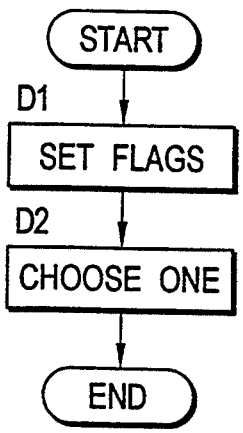
FIG. 12 is an alternative flow chart for the output unit illustrated in FIG. 1.
Figure 13:
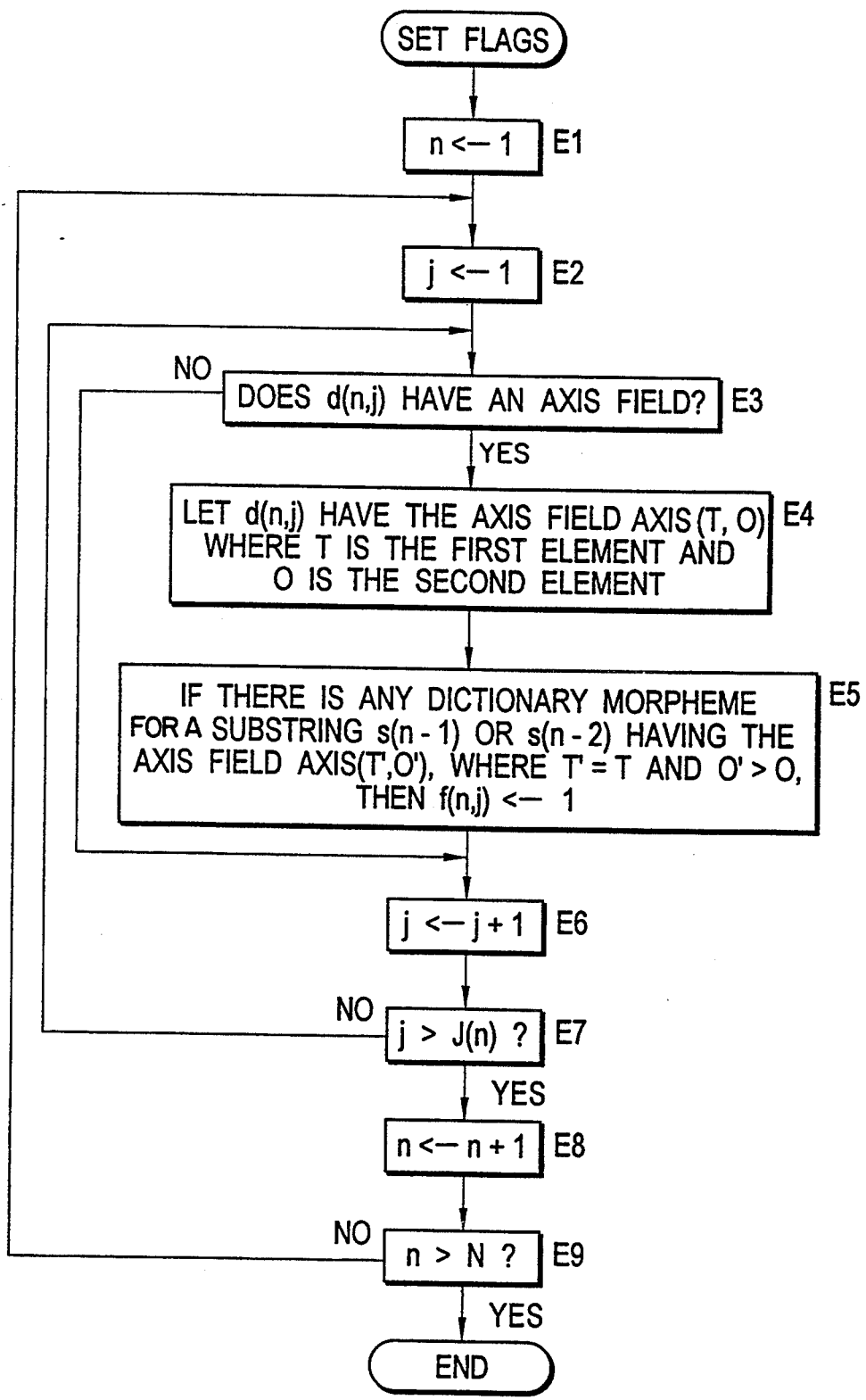
FIG. 13 is a detailed flow chart for one step of FIG. 7.
Figure 14:
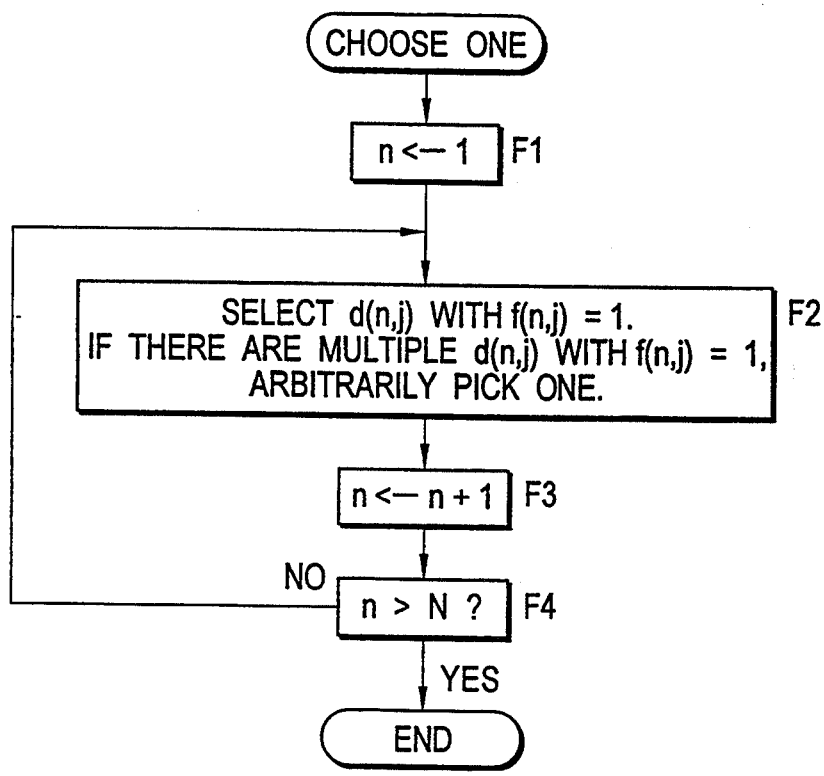
FIG. 14 is a detailed flow chart for another step of FIG. 7.

The output unit may be implemented in a microprocessor as illustrated in FIGS. 12-14. FIG. 12 is an upper level flow chart. At step D1 (corresponding to FIG. 13), possible memorized morphemes within the morpheme group are flagged. At step D2 (corresponding to FIG. 14), one memorized morpheme for the morpheme is chosen and output.

Referring to FIGS. 13 and 14, the input character sequence of N morphemes can be implemented as a string having N substrings, s (1), . . . , s (N). For each substring s(n), (n=1. . . N), there are one or more memorized morphemes d(n,j), (j=1. . . J(n)). J(n) should be large enough so that d(n,j) does not overflow. An array of flags f(n,j) is used, with flags which are set to 1 when there is a co-occurrence of a memorized morpheme with the same descriptor. All flags are initially reset to 0.

Referring now to FIG. 13, the output unit 17 searches the memory 16 and flags possible memorized morphemes in the following manner. In step E1, the output unit 17 initializes a counter n, and in step E2 the output unit 17 initializes a counter j. At step E3, it is determined whether the memorized morpheme d(n,j) has a non-empty AXIS field. If the AXIS field is empty, the entry is skipped. Otherwise, at step E4, the memorized morpheme is set to the AXIS field AXIS (T, O), where T is the first element and O is the second element. Next, at step E5, the output unit checks whether there is a memorized morpheme for either s(n−1) or s(n−2) where T'=T and O'>O. If so, the memorized morpheme d(n,j) is flagged by setting flag f(n,j) in the flag array. At step E6, counter j is incremented. At step E7, if j is less than J(n), the search continues at step E3. If j equals J(n), counter n is incremented at step E8. At step E9, if n is less than N, the search continues at step E2. In this way, the entire memory 16 is searched.

Referring now to FIG. 14, one of the flagged memorized morphemes is chosen as an analyzed morpheme in the following way. At step F1, the counter n is initialized to 1. At step F2, the memorized morphemes d(n,j) (j=1. . . J(n)) are searched. If the memorized morpheme d(n,j) is flagged, it is selected as the analyzed morpheme. If more than one memorized morpheme d(n,j) is flagged, any flagged memorized morpheme d(n,j) is arbitrarily selected. At step F3, the counter n is incremented. At step F4, if n is less than N, the search continues at step F2. In this way, all of the memorized morphemes are scanned. The analyzed morphemes are then output.

Figure 15:
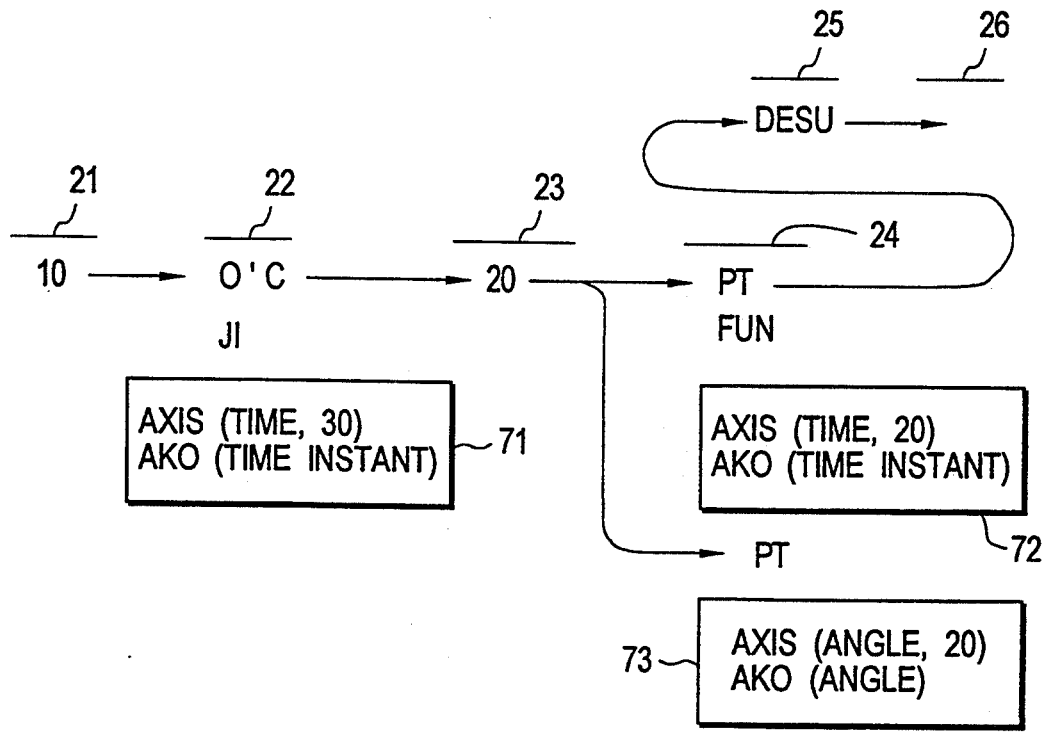
FIG. 15 is a schematic representation of a memory, which is used in the morpheme analysis device illustrated in FIG. 1.

FIG. 15 schematically represents the contents of the memory 16 when the morpheme analysis device is used. consider the example of a Japanese syntagm which reads "Zyûzi nizippun desu." In this example, a Japanese word "desu" means an English word set "It is" and is placed at the end of a sentence, followed by a full stop. If the Japanese word "desu" is omitted, the syntagmconsists of the above-described morphemes or characters "10", "O'C", "20", and "PT" and is so depicted. Including the Japanese word "desu", the syntagm means in English "It is twenty minutes past ten."

Reference now is made to both FIG. 15 and FIG. 2. At step A1, the syntagm is separated into morphemes, 21–26. In the memory 16, a plurality of memorized "morphemes" are stored at the first step A3 of FIG. 2 in connection with first through sixth morphemes 21, 22, 23, 24, 25, and 26. It should be noted that such morphemes 21 through 26 are depicted without regard to their actual lengths.

At step A2, for the first morpheme 21, only one dictionary morpheme, "10", is selected as a first candidate morpheme by the separating unit 12. Thus, only one candidate morpheme is stored by the separating unit 12 in the memory 16 as a memorized morpheme. For the second morpheme 22, a dictionary morpheme "O'C" is selected as a candidate morpheme and is stored as a second memorized morpheme. The second memorized morpheme here is accompanied by two field entries, AXIS(TIME, 30) and AKO(time instant), depicted in a first rectangle 71. For the third morpheme 23, only one dictionary morpheme, "20", is selected as a candidate morpheme and stored as a third memorized morpheme. For the fourth morpheme 24, first and second dictionary morphemes are selected as candidate morphemes and stored as a fourth primary and a fourth secondary memorized morphemes.

The fourth primary memorized morpheme, "PT", is accompanied by two field entries 32, AXIS(TIME, 20) and AKO(time instant). The fourth secondary memorized, also "PT", is accompanied by two different field entries 73, AXIS(ANGLE, 20) and AKO(angle).

In the illustrated example, the syntagm includes a time instant group having first and second morphemes "O'C" 22 and "PT" 24. Candidate morphemes are selected from the dictionary morphemes, are stored as memorized morphemes, and are accompanied by a descriptor TIME and two entries in the second AXIS field, "30" and "20", representative of the customary order, arranged in descending order. Note that the second, the fourth primary, and the fourth secondary memorized morphemes are the marked morphemes because they belong to morpheme groups.

The output unit 17 checks at the first step C1 of FIG. 11 whether or not each memorized morpheme is accompanied by the descriptor t and the identifier n. Successively checking the memorized morphemes in this manner, at the first step C1, the output unit 17 finds the descriptor TIME accompanying the second memorized morpheme 22. This will be represented in general by w. Also at the first step C1, the output unit 17 finds the mark "30" for the second morpheme 22. (Recall that the mark may be the identifier.) At the second step C2, the output unit 17 locates the descriptor TIME accompanying the fourth primary memorized morpheme. This will be represented by w'. The output unit 17 finds the mark "20" for the fourth morpheme 24. At step C2 for the fourth secondary memorized morpheme, the descriptor TIME is not found.

At the fourth step C4, the output unit finds that the second and the fourth primary memorized morphemes, w and w', are accompanied by the descriptor TIME in common, and by the identifiers which correctly indicate the customary order in the group. Then, the output unit 17 determines that the second and the fourth primary memorized morphemes, w and w', should be used as the analyzed morphemes, and that the fourth secondary memorized morphemes should be discarded from the result of analysis of the syntagm. The output unit 17 thereby selects at the fifth step C5 the first, the second, the third, the fourth primary, the fifth, and the sixth memorized "morphemes" as the analyzed morphemes. Thus, the ambiguities in the morpheme "PT" between the time instant and the measure of an angle are removed.

While this invention has thus far been described in specific conjunction with a single embodiment thereof, it will be readily possible to put this invention into practice in various other manners for one who is skilled in the art and is conversant with the Japanese language. For example, the syntagm may be written in other characters, such as an expression literally translated from Japanese into English and written in Roman letters.

Alternatively, the syntagm may be given by speech sound when the morpheme analysis device is used in a machine translation system put into operation by a substantially continuously spoken syntagm. In this latter event, the input connection 13 should be connected to a speech recognition device. A spoken language used with the machine translation system may not necessarily be the Japanese language. This is because some particular morphemes are used in a customary order in other languages, for example, a China address group in written or spoken Chinese.

It will also be appreciated that in another embodiment the analyzed morphemes may be produced in parallel.

Furthermore, although specific data structures have been illustrated, other data structures may be used to implement the dictionary morphemes, candidate morphemes, memorized morphemes, or other structures. Additionally, other methods of searching could be implemented, such as hashing.

While specific embodiments of the invention have been described and illustrated, it will be clear that variations in the details of the embodiments specifically illustrated and described may be made without departing from the true spirit and scope of the invention as defined in the appended claims.

What is claimed is:

1. In a machine translation system, a device for breaking a syntagm having a plurality of morphemes into analyzed morphemes, using predefined morpheme groups, said device comprising:
   (a) a dictionary for storing a plurality of dictionary morphemes;
   (b) a separating unit, said separating unit accessing said dictionary morphemes in said dictionary and receiving said syntagm, wherein said separating unit separates said syntagm into at least one separated morpheme and for each of said separated morphemes selects at least one candidate morpheme from said dictionary morphemes based on said separated morpheme;
   (c) a memory accessed by said separating unit, said memory storing said candidate morphemes as memorized morphemes, wherein at least one of said memorized morphemes is stored for each of said Separated morphemes; and
   (d) an output unit connected to said separating unit, said output unit accessing said memorized morphemes in said memory, wherein, for each of said separated morphemes, said output unit selects one of said memorized morphemes by determining for each separated morpheme one of said morpheme groups to which said separated morpheme belongs, said output unit outputting as one of said analyzed morphemes said selected memorized morpheme.

2. A device as claimed in claim 1, wherein:
   (a) at least a portion of said dictionary morphemes are marked morphemes, said marked morphemes including at least one of (1) a descriptor indicating to which one of said morpheme groups said marked morpheme belongs, and (2) an identifier indicating a customary order in a language;
   (b) said memorized morphemes include a plurality of M marked morphemes, when said syntagm includes at least a portion of said morphemes in said morpheme group to which said marked morpheme belongs;
   (c) said output unit selects said marked morphemes from said memorized morphemes, and uses said marked morphemes as said analyzed morphemes when said identifier indicates that said marked morphemes are in said customary order.

3. In a machine for translation system, a device for breaking a syntagm having a plurality of morphemes into analyzed morphemes, said device comprising:
   (a) a dictionary for storing a plurality of dictionary morphemes;
   (b) a separating unit connected to said dictionary and receiving said syntagm, for separating said syntagm into a plurality of morphemes and for selecting at least one candidate morpheme from said dictionary morphemes in said dictionary for each of said separated morphemes based on said separated morphemes;
   (c) a memory connected to said separating unit, for storing at least one of said candidate morphemes as a memorized morpheme for each of said morphemes; and
   (d) an output unit connected to said memory, for outputting at least one of said memorized morphemes as said analyzed morpheme for each of said separated morphemes.

4. A device as claimed in claim 3, wherein:
   (a) said dictionary stores (1) a first through G-th plurality of descriptors including a g-th descriptor, and (2) a first through G-th plurality of identifiers including a g-th identifier, where G represents a natural number which is not less than two, g being variable between two and G, inclusive, said g-th descriptor and said g-th identifier accompanying each of a first g-ary through N(g)-th g-ary plurality of said dictionary morphemes, where N(g) represents a first g-ary integer which is not less than two, said g-th descriptor representing a g-th group including said first g-ary through said N(g)-th g-ary morphemes in a g-th customary order from said first g-ary morpheme to said N(g)-th gary morpheme, said g-th identifier indicating said customary order;
   (b) said memory stores a plurality of g-ary marked morphemes having said g-th descriptor and said g-th identifier, when said syntagm includes at least one of a first g-ary through M(g)-th g-ary plurality of at least one of said first g-ary through N(g)-th g-ary morphemes, where M(g) is not greater than N(g); and
   (c) said output unit outputs said g-ary marked morpheme from said memorized morphemes as said analyzed morpheme when said memorized morpheme is accompanied by said g-th descriptor and said g-ary identifier indicates that said g-ary marked morphemes are in said g-th customary order.

5. A device as claimed in claim 3, wherein:
   (a) said dictionary stores a first g-ary through N(g)-th plurality of g-ary marks accompanying a first g-ary through N(g)-th plurality of g-ary morphemes, each of said first g-ary through said N(g)-th g-ary marks used as a g-th identifier indicating a customary order of morphemes within one of said morpheme groups in a language, where g represents a natural number not less than two, N(g) represents a first g-ary integer which is not less than two, and M(g) is not greater than N(g);
   (b) said memory stores a g-th descriptor and a portion of said first g-ary through said N(g)-th g-ary marks as a plurality of first g-ary through M(g)-th g-ary marked morphemes, including g-ary marked morphemes, said descriptor indicating to which one of said morpheme groups said marked morphemes belong; and
   (c) on the condition that at least one of said first g-ary through M(g)-th g-ary marked morphemes indicate that said g-ary marked morphemes are in said customary order of said g-th identifier, said output unit outputs said g-ary marked morphemes as said analyzed morphemes.

6. In a machine translation system, a method for breaking a syntagm having a plurality of morphemes belonging to a morpheme group into analyzed morphemes, said method comprising the steps of:
   (a) inputting a syntagm;
   (b) separating said syntagm into a plurality of separated morphemes;
   (c) for each of a first morpheme and a subsequent morpheme of the plurality of separated morphemes, selecting and storing at least one of a plurality of dictionary morphemes including a descriptor field and an identifier field as a candidate morpheme based on said separated morphemes, said descriptor field having a descriptor indicating to which one of said morpheme groups said morpheme belongs, and said identifier field having an identifier indicating a customary order in a language;
   (d) checking whether said first morpheme has at least one candidate morpheme selected and stored which has (1) a descriptor equal to a descriptor of at least one candidate morpheme for said subsequent morpheme, and (2) an identifier less than an identifier of said candidate morpheme for said subsequent morpheme, and if said checking step has an affirmative result, marking said candidate morpheme as a marked morpheme;
   (e) repeating step (d) for said plurality of separated morphemes, using said subsequent morpheme as said first morpheme;
   (f) selecting each of said marked morphemes as analyzed morphemes; and
   (g) outputting said analyzed morphemes.

* * * * *